United States Patent [19]
Olah

[11] 3,756,191
[45] Sept. 4, 1973

[54] DIAL POINTER DRIVER ASSEMBLY FOR RADIO RECEIVER
[75] Inventor: Emery E. Olah, Schaumburg, Ill.
[73] Assignee: Motorola, Inc., Franklin Park, Ill.
[22] Filed: Sept. 25, 1972
[21] Appl. No.: 292,031

[52] U.S. Cl. ................ 116/124.1 R, 74/110, 334/7
[51] Int. Cl. ............................................. H03j 1/02
[58] Field of Search ..................... 116/124.1, 124.2, 116/124.3, 124.4; 74/10.27, 10.29, 10.31, 10.33, 10.35, 10.37, 10.39, 110; 325/455; 334/86, 87, 7

[56] References Cited
UNITED STATES PATENTS
| | | | |
|---|---|---|---|
| 2,318,554 | 5/1943 | Raney | 74/10.29 X |
| 2,333,355 | 11/1943 | Benton et al. | 116/124.1 R |
| 2,953,927 | 9/1960 | Race | 74/10.27 |
| 3,227,129 | 1/1966 | Frank | 116/124.1 R |

*Primary Examiner*—Louis J. Capozi
*Attorney*—Vincent J. Rauner, Ronald J. LaPorte et al.

[57] ABSTRACT

A dial pointer assembly for a manually tunable radio receiver includes a slide member carrying a pointer and mounted for movement along a path parallel to a dial scale. Coupled between the slide member and a movable variable frequency tuning core carriage of the radio receiver is a parallelogram linkage including a plurality of pivotally interconnected arms which serve to define portions of first and second parallelograms; the arms of the second of which are shorter in length than those of the first. A point of interconnection of a pair of arms of the second defined parallelogram is coupled operatively to a driver mechanism including a bell crank connected to the core carriage. Movement of the latter by operation of the manual tuning controls of the radio receiver; i.e., pushbutton or manual control knob, drives the pointer mechanism with respect to the dial scale. The movement of the slide member and pointer mechanism is magnified by the ratio of the length of an arm of the first parallelogram with respect to the length of an arm of the second.

11 Claims, 4 Drawing Figures

PATENTED SEP 4 1973 3,756,191

DIAL POINTER DRIVER ASSEMBLY FOR RADIO RECEIVER

BACKGROUND

This invention relates generally to pushbutton type radio receivers and more particularly to dial pointer indicators and drive mechanisms therefor which are used in such radio receivers for indicating the frequency to which the radio receiver is tuned.

Many varieties of dial pointer drive mechanisms for radio receivers are known. For the most part, those in use function adequately to provide a satisfactory visual indication on a matched scale, of the frequency to which the radio receiver is tuned upon operation of the manual or pushbutton tuning apparatus of the radio receiver. Many of the available dial pointer drive mechanisms must, however, be fabricated specifically for the radio receivers in which they are to be used since variations due to pointer travel and extension thereof in the receiver affect the drive mechanism dimensionally. In some cases, the movement of the dial pointer on a substantially straight line adjacent the dial scale is provided only if the dial pointer extension is of a predetermined length. Thus, for a particular radio receiver, the drive mechanism must be dimensioned accordingly, to provide such pointer extension. Consequently, for variations in styles of radio receivers, correspondingly dimensioned dial pointer drive mechanisms must be provided.

SUMMARY

Accordingly, it is an object of the present invention to provide a new and improved dial pointer drive mechanism for a radio receiver which can be used with a minimum of dimensional variation in substantially any radio receiver regardless of the pointer travel and extension required.

It is still another object of the present invention to provide a dial pointer drive mechanism of the above described type which further produces substantially constant ratio drive; i.e., the movement of the pointer is proportional to the movement of the driving medium substantially throughout the extent of the travel thereof.

It is a further object of the present invention to provide a dial pointer drive mechanism as described heretofore which is simple in construction, relatively free of binding and is low in cost.

Briefly, an embodiment of the pointer drive assembly according to the invention comprises a slide member carrying a pointer and mounted for movement along a predetermined path parallel to a dial scale of a radio receiver. Coupled to the slide member is a parallelogram linkage. The linkage includes a plurality of pivotally interconnected arms which serve to define portions of first and second parallelograms. At least one of the arms of the second parallelogram is formed from a portion of an arm of the first parallelogram, the arms of the second parallelogram being shorter in length than those of the first parallelogram. A point of interconnection of a pair of the arms of the second parallelogram is coupled operatively by means including a bell crank mechanism, to the movable core carriage of the radio receiver. Movement of the core carriage along a predetermined path in response to the operation of a manually operated pushbutton or manual tuning control of the receiver, produces a resultant movement of a similar point of interconnection of corresponding arms of the first parallelogram to in turn move the slide member, the latter being attached thereat. The movement of the slide member is magnified by the ratio of the length of an arm of the first parallelogram with respect to that of the second parallelogram.

In addition to the bell crank mechanism, a pivotally connected or slideable arm may be used to transmit movement of the bell crank to the parallelogram linkage.

DETAILED DESCRIPTION

Figure 1:
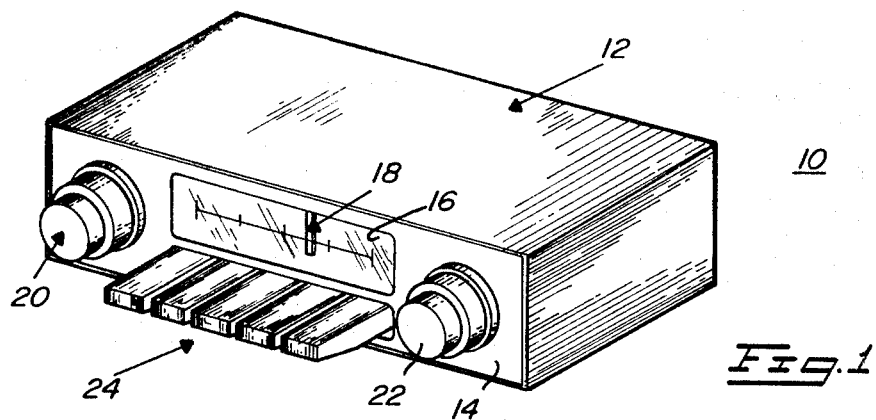
FIG. 1 is a perspective view of a pushbutton radio receiver including a dial pointer and drive mechanism therefor according to the invention.

Referring now to the drawings in greater detail wherein like numerals have been used throughout the various views to designate similar parts, there is shown in FIG. 1, a push-button radio receiver 10 of the type found in automobiles and the like vehicles. The radio receiver includes an outer housing or case 12 into which the mechanical and electrical components of the receiver are placed. A front wall 14 of the housing includes a plurality of control members mounted thereon, as well as a dial scale 16, behind which is located a pointer 18 movable along a path parallel to the scale for indicating thereon the frequency to which the radio receiver is tuned at any particular time.

A first control knob assembly 20 extends outwardly from wall 14 on the left side of dial scale 16 as viewed in FIG. 1, and controls the on/off operation and tone of the radio receiver. A second control knob assembly 22 extending outwardly from wall 14 on the opposite side of scale 16, provides manual tuning of the radio receiver to change the radio frequency setting thereof; dial pointer 18 moving along scale 16 in accordance with the operation thereof.

A set of five manually operated pushbuttons 24 extends outwardly through wall 14 of the radio receiver beneath dial scale 16. Each of the pushbuttons may be set for recalling a predetermined frequency setting in the well known manner. Both the pushbuttons and manual tuning knob 22 are coupled to movable frequency selecting apparatus, conventionally a slideable tuning core carriage assembly including a slideable core carrying bar such as 26 (FIG. 2), which in turn is coupled to the dial pointer drive mechanism according to the invention for moving the latter to provide a visual indication of the frequency setting to which the radio receiver is tuned.

Figure 2:
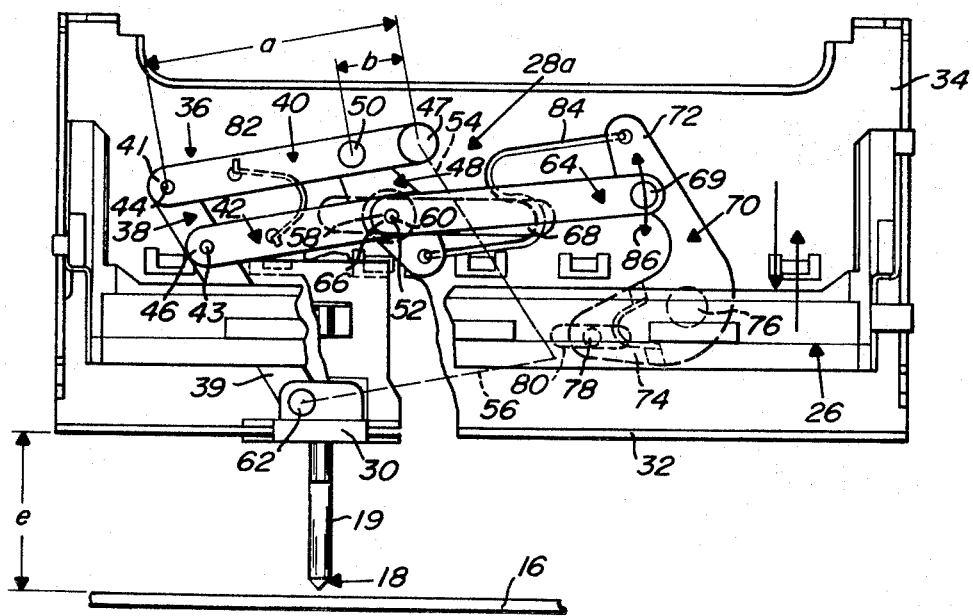
FIG. 2 is a bottom, partially cutaway, plan view of one embodiment of a dial pointer drive mechanism according to the invention.
Figure 3:
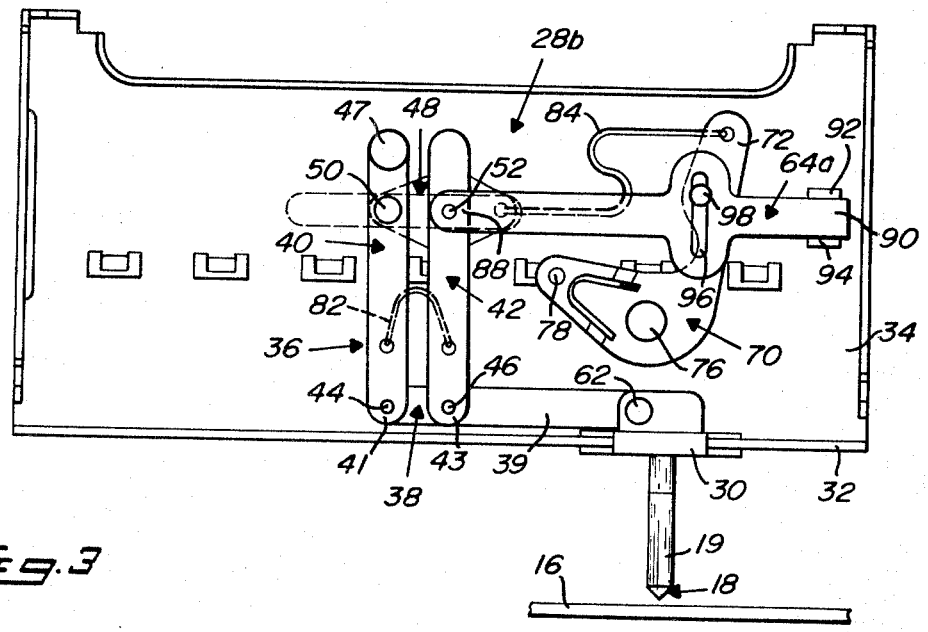
FIGS. 3 and 4 are bottom, plan views of two other embodiments of a dial pointer drive mechanism according to the invention.
Figure 4:
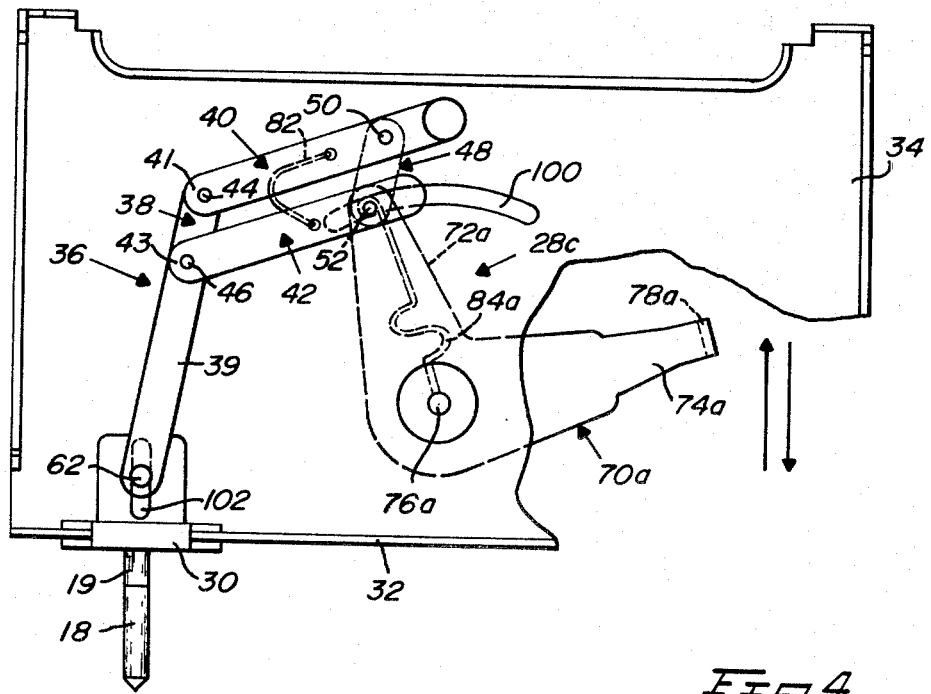

Turning now to FIGS. 2–4 of the drawings, there is illustrated in each of the figures, an embodiment 28a, 28b and 28c, respectively, of a dial pointer assembly according to the invention.

Looking first to the dial pointer assembly 28a of FIG. 2, there is included therein a pointer 18 similar to that of FIG. 1 movable along a path parallel with respect to dial scale 16 located adjacent thereto. The pointer is in fact L-shaped with a first portion extending into the page as viewed in FIG. 2 and a second portion 19 connected to a member 30 mounted for sliding movement on a track 32 extending the length and along the edge of a plate or base member 34 upon which the pointer drive mechanism is mounted. The pointer extension "e," i.e., the distance between the radio receiver and the dial scale, may be changed merely by extending or reducing portion 19 of the pointer without changing the dimensions, etc. of the assembly itself.

Coupled to the slide member 30 is a modified parallelogram or pantograph linkage assembly 36. The last-mentioned parallelogram assembly includes a first arm 38 coupled pivotally at a first end 39 in the embodiment of FIG. 1, to the slide member 30. Two other arms 40 and 42 of substantially the same length as arm 38 are connected pivotally at first ends 41, 43, respectively, to arm 38 at predetermined, spaced points 44, 46, therealong. Arm 40 is also connected pivotally at the opposite end 47 thereof to the plate member 34. A fourth, shorter arm 48 is connected pivotally at points 50, 52 on arms 40 and 42, respectively; the distance between points 50, 52 being substantially equal to that between points 44, 46, thereby maintaining arms 40, 42 and arms 38, 48, respectively, in parallel alignment at all times.

The arrangement of the above described arms defines a portion of a pair of parallelograms. The first parallelogram is formed by arms 38 and 40, and two other imaginary arms 54, 56, illustrated in dotted lines in FIG. 1. The second parallelogram is formed by the portion of arm 40 between pivot points 47 and 50, the portion of arm 48 between pivot points 50 and 52 and two other imaginary arms, one being arm 58 and the other being the portion of imaginary arm 54 extending between pivot point 47 and the point of intersection 60 of imaginary arms 54 and 58.

The pantograph or parallelogram linkage 36 formed by the interconnected arms as described, has a driving point 52 at which a driving force is applied and a driven point 62 at the connection of arm 39, imaginary arm 56 and pointer slide 30. Thus, any movement of point 52 produces a similar movement at point 62 but which is magnified in accordance with the ratio of the length "a" of one of the arms such as 40, of the first defined parallelogram with respect to an arm defining the second parallelogram "b" between pivot point 50 whereat arm 48 is connected and the stationary pivot point 47 of arm 40; i.e., a/b as illustrated in FIG. 1. In the case of the dial pointer assembly, any movement at point 52 is magnified at point 62 so that a driving force applied by the motion of core bar 26 in the direction of the arrows, due to the operation of one of the manually operable push-buttons or the manual tuner knob of the radio receiver 10 causes in turn a movement of dial pointer 18 with respect to scale 16.

In the embodiment of the dial pointer drive assembly of FIG. 2, there is connected also at driving point 52, an arm 64. A rivet 66 or the like fastener is provided at point 52. The rivet is received in a guide slot 68 formed in plate 34 in parallel alignment with track 32. The slot is unnecessary to maintain the movement of point 52 along a path parallel with respect to the movement of slide member 30 since this movement is assured by the mounting of the lastmentioned member 30 on track 32. The slot has been provided only to stabilize the assembly. The arm 64 is connected pivotally also at the opposite end 69 thereof, to a first leg 72 of a bell crank 70 which is itself connected pivotally, substantially midway between arms 72, 74 thereof to panel 34 by means of a rivet 76 or the like fastener. The other arm 74 of the bell crank includes a pin 78 extending therefrom which is received in slot 80 provided in the slideable core bar 26 to couple the latter to the bell crank. A pair of springs 82, 84 are provided between arms 40, 42 and 48 and bell crank 70, respectively, to prevent backlash in the assembly during movement thereof.

In operation, movement of the core bar in the direction of the arrows in response to the actuation of manual tuner knob 22 or the depression of one of the set of manually operated pushbuttons 24, transmits a force to bell crank 70 which in turn is rotated in a corresponding direction. Rotation of the bell crank causes, through arm 64, a resultant movement at driving point 52 which in turn moves slide member 30 along track 32 to reposition pointer 18 with respect to dial scale 16.

In the dial pointer drive assembly embodiment 28a, the movement of the pointer along the dial scale is substantially constant with respect to the movement of core bar 26. Only a slight error is present in the movement of pointer 18 along path 32 with respect to the movement of core bar 26. This error is due to the slight arcuate movement (see arc 86) of end 69 of arm 64 during operation of the assembly. This error is so slight, however, that with an arm 64 of approximately 1.2 inches in length, the error produced is a delay of movement of pointer 18 of approximately 0.003 inches when the point 69 of attachment of the arm 64 to bell crank 70 and point 52 form a straight line which is oblique with respect to track 32 along which slide member 30 moves.

To correct the above error, the arm 64 may be modified as shown in FIG. 3. In this embodiment, 28b, of the dial pointer assembly, all of the components are similar to those of the embodiment 28a of FIG. 2, except that an arm 64a well known as a scotch yoke, has been substituted for arm 64 of FIG. 2.

Arm 64a is connected pivotally at one end 88 thereof to the parallelogram linkage at driving point 52 just as in the case of arm 64 of FIG. 2, however, the opposite end 90 of arm 64a is held for sliding motion between a pair of guide members 92, 94 to maintain movement of the arm along a path parallel to track 32. The location of connection of arm 64a to bell crank 70 is at slot 96 formed in the arm 64a. A pin or rivet member 98 extending from bell crank arm 72 is received in slot 96. Thus, upon rotation of bell crank 70 in response to the movement of core bar 26, arm 64a is moved only in a direction parallel to track 32 and the resultant movement of slide member 30 is constant along its entire path of travel with respect to the movement of the core bar.

Still another embodiment 28c of the dial pointer drive assembly according to the invention is illustrated in FIG. 4 of the drawings. In this embodiment the pointer 18 is also mounted for movement on a slide member 30 which is itself mounted on a track 32 along the front edge of the base plate 34 upon which the entire assembly is mounted. Likewise, a parallelogram linkage 36 is connected to the slide member. A bell crank 70a is mounted for rotational movement on plate 34. The bell crank 70a is positioned in a direction opposite that of bell crank 70 of FIGS. 2 and 3, with leg 74a thereof extending in the opposite direction from leg 74 of bell crank 70. In the case of bell crank 70a, leg 72a is connected directly to driving point 52 of the parallelogram linkage and the end 78a of leg 74a is coupled directly to core bar 26 (not shown). An antibacklash spring 84a is provided between driving point 52 and the pivot point 76a of bell crank 70a.

In operation, movement of core bar 26 in the directions of the arrows (FIG. 4) causes bell crank 70a to be rotated in a corresponding direction. Leg 72a thereof in turn moves in an arc 100 to move the parallelogram linkage. The slide member 30 is moved in response to the latter movement, along track 32. Because of the arcuate movement of driving point 52, driven point 62 tends also to move arcuately. To compensate for the latter arcuate movement so that slide member 30 is free to slide along path 32, a slot 102 is provided in the slide member. Thus, any arcuate movement of point 62 is accommodated by the slot to eliminate binding.

The embodiment 28c of the dial pointer drive assembly likewise provides substantially constant proportional movement of the slide member with respect to the movement of core bar 26, since the movement of the legs of the bell crank is constant and the movement of the driving and driven points 52 and 62, respectively, of the linkage assembly 36 is constant as well.

Each of the embodiments of the dial pointer drive assemblies has definite advantages over prior art arrangements. Each embodiment may be used in substantially all types of radio receivers since a minimal amount of changes dimensionally, are required when using the assembly in variously dimensioned radio receivers. Since the travel of the pointer is always parallel to the dial scale provided, all that is required for a change in the distance "e" (FIG. 2) between the radio receiver and dial scale is to extend or reduce the length of leg 19 of the pointer.

The substantially constant output movement of the dial pointer along the path of travel adjacent the dial scale with respect to input movement provided by the assembly makes the use of the latter substantially without change, possible regardless of the core bar travel requirements. Furthermore, the parallelogram linkage provides an accurate magnification of movement of the pointer mechanism with a minimum of binding.

If it is desired to increase or decrease the total travel length of the pointer along the dial scale while maintaining the movement thereof proportional to the movement of the core bar, this can be accomplished easily by changing the lengths of the bell crank arms of the driver assembly. The latter may become necessary if a driver assembly from one radio receiver having a dial scale of a first length is to be used in another radio receiver having a dial scale of a second length. In both cases, regardless of the bell crank arm lengths, the travel of the pointer throughout the length of the dial scale will be proportional to the movement of the core bar driver. Only the ratio of movement of the core bar along its path to the movement of the dial pointer along the dial scale will be varied.

While several embodiments of the invention have been shown and described, it should be understood that the invention is not limited thereto since many other modifications thereof may be made. It is therefore contemplated to cover by the present application any and all such modifications as fall within the true spirit and scope of the appended claims.

I claim:
1. In a radio tuner apparatus including manually operated tuner control means and variable frequency tuning means coupled to said manually operated tuner control means for movement thereby along a predetermined path to adjust the frequency setting of said radio tuner, an indicating assembly for displaying visually the frequency setting of said tuning means, including in combination; a dial scale having indicia thereon corresponding to the frequencies to which said variable frequency tuning means can be adjusted, a pointer movable along a path adjacent said dial scale in cooperation therewith and pointer driver means interposed between said variable frequency tuning means and said pointer for movement of the latter in accordance with the movement of the former, said pointer driver means including a parallelogram linkage assembly including first means defining a first parallelogram having arms of a predetermined length, and second means defining a second parallelogram having arms of a second predetermined length, shorter than the arms of said first means, at least one of the arms of said lastmentioned parallelogram being coextensive with one of the arms of said first-mentioned parallelogram and being formed from a portion thereof, said arms of said parallelograms being pivotally interconnected and a first point of connection of a pair of arms defining said second parallelogram providing a driving point, and a point of interconnection of corresponding arms defining said first parallelogram providing a driven point, said pointer being connected to said driven point and said variable frequency tuning means being operatively coupled to said driving point, whereby upon movement of the latter said pointer is moved correspondingly with respect to said dial scale, the movement of said driven point being magnified by the ratio of the length of an arm defining said first parallelogram with respect to the length of an arm defining said second parallelogram.

2. Radio tuner apparatus as claimed in claim 1 wherein said dial scale is elongated and extends in a substantially straight line between opposite sides of said radio tuner and wherein said indicating assembly further includes a member movable along a fixed path substantially parallel to said dial scale, said pointer being mounted for movement on said member.

3. Radio tuner apparatus as claimed in claim 2 wherein said first means defining said first parallelogram include first and second arms of equal length, first ends of said arms being coupled together pivotally, the second end of a first one of said arms being coupled pivotally to a stationary support and the second end of said second one of said arms being coupled pivotally to said member movable along said fixed path, wherein said second means defining said second parallelogram include an arm coupled pivotally at a first location thereon to said first one of said arms included in said first parallelogram, between first and second ends of the latter nearer the stationary pivotal point thereof, and coupled pivotally at a second location thereon to said driving point, and wherein said parallelogram linkage assembly further includes a support arm coupled pivotally to said arm defining said second parallelogram at the point thereof coupled to said driving point and pivotally to the second arm defining said first parallelogram at a location thereon whereby said support arm is maintained in parallel relation to said first arm defining said parallelogram, at all times.

4. Radio tuner apparatus as claimed in claim 1 wherein said pointer driver means further includes a bell crank mounted for pivotal movement, a first leg of said bell crank being coupled to said variable frequency tuning means and the second leg thereof being coupled to said parallelogram linkage assembly for operatively moving said driving point in response to the movement of said variable frequency tuning means, thereby to drive said pointer with respect to said dial scale.

5. Radio tuner apparatus as claimed in claim 4 wherein said variable frequency tuning means includes a bar member movable along a predetermined path having a slot formed therein and wherein the first leg of said bell crank includes a protrusion extending therefrom and received in said slot for sliding and pivotal motion with respect thereto in response to the movement of said core bar.

6. Radio tuner apparatus as claimed in claim 4 wherein said pointer drive means further includes an arm member interposed between said parallelogram linkage and said bell crank for translating the rotational movement of said bell crank into corresponding movement for driving said pointer along said path adjacent said dial scale.

7. Radio tuner apparatus as claimed in claim 3 wherein said arm member is of a predetermined length and is connected pivotally at a first end thereof to the driving point of said parallelogram linkage and at the opposite end thereof to said second leg of said bell crank.

8. Radio tuner apparatus as claimed in claim 5 wherein said arm member comprises a scotch yoke having a first end thereof coupled pivotally to the driving point of said parallel linkage assembly, and being coupled also to the second leg of said bell crank.

9. Pointer driver apparatus for use in a radio receiver including manually operable tuner control means, variable frequency tuning means coupled to said manually operable tuner control means for movement thereby along a predetermined path to adjust the frequency setting thereof, a dial scale and pointer movable along a predetermined path adjacent said dial scale to indicate visually the frequency to which said variable frequency tuning means is set, said pointer driver apparatus including in combination; a parallelogram linkage assembly comprising first means defining a first parallelogram having arms of a predetermined length and second means defining a second parallelogram having arms of a second predetermined length, shorter than the arms of said first parallelogram, at least one of the arms of said second parallelogram being coextensive with an arm of said first parallelogram and being formed from a portion thereof, the arms of said parallelogram linkage assembly being pivotally interconnected, a first point of interconnection of a pair of arms defining said second parallelogram providing a driving point and a second point of interconnection of corresponding arms defining said first parallelogram providing a driven point, the driven point being movable in accordance with the movement of said driving point, said movement being magnified by the ratio of the length of an arm of said first parallelogram with respect to the length of an arm of said second parallelogram, said pointer being connected at said driven point and said variable frequency tuning means being operatively coupled to said driving point, whereby upon movement of the latter said pointer is moved with respect to said dial scale.

10. Pointer driver apparatus as claimed in claim 9 further including bell crank means mounted for pivotal movement, a first leg of said bell crank means being coupled to said variable frequency tuning means and the second leg thereof being coupled to said parallelogram linkage for operatively moving said driving point in response to the movement of said variable frequency tuning means, thereby to drive said pointer with respect to said dial scale.

11. Pointer driver apparatus as claimed in claim 10 further including an arm member interposed between said parallelogram linkage and said bell crank for translating the rotational movement of said bell crank into corresponding movement for driving said pointer along said path adjacent said dial scale.

* * * * *